April 18, 1944.  J. T. LITTLETON ET AL  2,347,116
METHOD OF TEMPERING GLASS ARTICLES
Filed June 24, 1937  2 Sheets-Sheet 1

INVENTORS
JESSE T. LITTLETON
AND RALPH K. DAY
BY Dorsey, Cole + Harver
ATTORNEYS.

INVENTORS.
JESSE T. LITTLETON
AND RALPH K. DAY
BY Dorsey, Cole + Harmer
ATTORNEYS.

Patented Apr. 18, 1944

2,347,116

UNITED STATES PATENT OFFICE 2,347,116

METHOD OF TEMPERING GLASS ARTICLES

Jesse T. Littleton and Ralph K. Day, Corning, N. Y., assignors to Corning Glass Works, Corning, N. Y., a corporation of New York Application June 24, 1937, Serial No. 150,172

5 Claims. (Cl. 49—89)

The present invention relates to tempering glass articles and particularly to the tempering of hollow glass articles which cannot be satisfactorily tempered by conventional methods.

A common method of tempering glass articles is to heat them throughout to a uniform temperature above the strain point of the glass and while in this heated condition submerge them in a bath of chilling fluid maintained at a suitable temperature. Such a method has proven quite satisfactory for tempering articles of substantially uniform thickness providing any changes in contour are gradual and all surfaces are so exposed to the fluid that its free circulation about them is to no large extent impeded. A sauce pan pressed from heat resistant glass is a good example of an article having the above characteristics. Such an article, when tempered in the foregoing manner will, upon removal from the bath, have a uniform and substantially equal degree of compression chilled into all surfaces thereof which is balanced by interior forces of tension. The sauce pan is more or less uniform in wall thickness and hence all parts of the dish cool at the same rate, resulting in a satisfactory tempered article, all of the surfaces of which are under a state of compression.

When, however, the contour of the article is such that the fluid contacting certain surfaces thereof is not free to circulate, the rate of cooling these surfaces is slower than the rate of cooling other surfaces where the liquid can circulate freely by convection currents. This difference in the rate of cooling the various parts of the article results in the existence of temperature gradients between different points on the surface of the article, and when the article finally comes to room temperature throughout, the surfaces which have been cooled in the chilling operation at the slower rate will have a lower degree of compression or may even have a certain amount of tension. In any surface under tension, or under very slight compression with consequently a very thin compressional layer, the slightest scratching or bruising thereof is likely to start a crack in the article and cause failure.

This latter condition is especially likely to develop in a blown article where there is considerable variation in the wall thickness. Even if such an article were treated uniformly with a chilling fluid, the heavier sections cool more slowly than the thinner sections and hence there is likely to be a boundary zone between the heavy and light portions of the article with very much reduced compression in the surface or, in some cases, tension existing in the surface. This condition is very likely to be found in a blown bottle where often the wall at the junction of the bottom and side wall is much thinner than the bottoms of the bottle.

The primary object of the present invention is to teach methods which can be employed to satisfactorily temper glass articles not satisfactorily tempered by prior known methods.

Among its features the present invention embodies a tank containing a bath of tempering fluid having associated therewith a tubular support adapted for the receipt, in inverted position, of a hollow object to be tempered with the opening thereof submerged in the path; a reservoir connected with a vacuum line and with such support respectively whereby fluid can be drawn from the bath until the object is filled therefrom and the drawing of fluid from the bath through the object and tubular support into such reservoir continued for a time period sufficient to suitably chill the inner surfaces of the object while the outer surfaces are being simultaneously chilled by lowering of the support into the bath.

In an alternative embodiment of the invention the support is adapted to initially hold the object in an upright position above the bath, while a spray nozzle in communication with the reservoir directs sprays of a chilling fluid against selected surface areas to more highly chill them than others and the action continued until sufficient fluid has been forced into and out of the object to suitably chill the inner surfaces thereof. As in the first embodiment, the support is preferably progressively submerged into the bath as the fluid level rises in the object to simultaneously chill the exterior surfaces thereof, although it is to be understood that the invention also contemplates a method involving the introduction of a chilling medium into the interior of the object before submergence thereof.

In a further embodiment of the invention, the article to be tempered is supported in an inverted position on a rotating table with which are associated fixed chambers having apertures which direct streams of a suitable fluid against the surfaces of the object as they pass in front of such apertures. The size and arrangement of the apertures are such that the junction of the side wall and bottom of the object receive the most vigorous chill.

The accompanying drawings illustrate forms of apparatus, which may be employed in practicing the alternative tempering methods embodying the invention, adapted for use in chilling milk bottles and of course are for illustrative purposes only.

Figure 1:
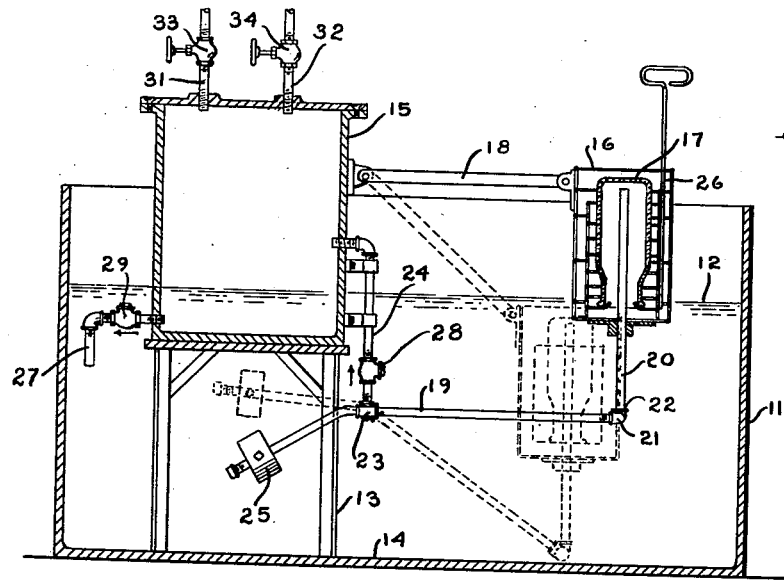
Fig. 1 is a vertical elevation partly in section through one form of apparatus suitable for tempering glass bottles in which the bottles are lowered, mouth downward, into the chilling bath while being held in a vertical position.

The apparatus illustrated in Fig. 1 includes a tank 11 containing a bath of chilling fluid 12 maintained at a suitable chilling temperature ordinarily between 350° C. and 500° C., depending on the characteristic of the glass and the intensity of chill it is to receive. Mounted on a suitable frame 13, resting on the tank bottom 14, is a closed reservoir 15 partly submerged in the chilling fluid 12 contained in the tank 11. A copper wire cage 16, for receiving a bottle 17 to be chilled, is normally held in an upright position and slightly submerged in fluid jointly by a link 18 pivotally connected to the one side of the cage 16 and reservoir 15 respectively and by a tubular support 19. This support includes a suction tube 20 which extends up through the center of the cage 16 in fixed relation to the bottom thereof. The lower end of tube 20 is pivotally attached to the tubular support 19 by a street elbow 21 threaded into an elbow 22 tightly threaded to support 19. A similar pivoted connection 23 is provided at the junction of support 19 and a vertically disposed fluid line 24 entering the reservoir 15 at a point well above the fluid level in tank 11. A check valve 28 in fluid line 24 permits flow of fluid toward the reservoir only. A counter balance 25 extending to the left of pivoting point 22 and secured in fixed relation with respect to the tubular support 19 normally holds the cage 16, a bottle conveying cage 26, and an empty bottle 17 in the position shown. The reservoir 15, near the bottom, has a submerged outlet tube 27 passing through a check valve 29 which permits the flow of fluid out of the reservoir only; while the reservoir at the top is connected to vacuum and pressure lines 31 and 32 containing valves 33 and 34.

In employing the foregoing apparatus valve 34 is closed, and valve 33 opened and suitably preheated bottle 17 and its conveying cage 26 placed in cage 16. The instant the mouth of the bottle is sealed by its immersion into the fluid the resultant vacuum inside the bottle causes it to be filled with chilling fluid almost instantaneously and as the liquid level rises in the bottle the effect of counterbalance 25 is overcome so that the bottle itself becomes submerged and circulation of fluid, by convection about its external surfaces effectively chills them. In order to prevent the fluid contacting the inner surfaces of the bottle from becoming stagnant and therefore ineffective to conduct heat away from such surface the valve 33 is left open until sufficient fluid has been circulated past the interior surfaces of the bottle to chill them to the temperature of the fluid in the bath. The bottle and carrying cage 26 are then lifted from cage 16, allowing the latter to restore to its initial position. At intervals dependent on the capacity of reservoir 15, valve 33 is closed and valve 34 opened to quickly force the fluid drawn into the reservoir back into the tank 11 through the passage 27.

Bottles having a substantially uniform wall thickness tempered in the above described manner have proven much superior to similar bottles tempered by the ordinary immersion method, although the degree of compression in the areas of small radii of curvature is not always as high as might be desired. This drawback can be fully overcome by more intensely chilling the areas of small radii of curvature than those surrounding them, so that the intensely chilled areas will still have a substantial layer of compression therein in spite of the tendency of these parts to change characteristics as the article cools.

Figure 2:
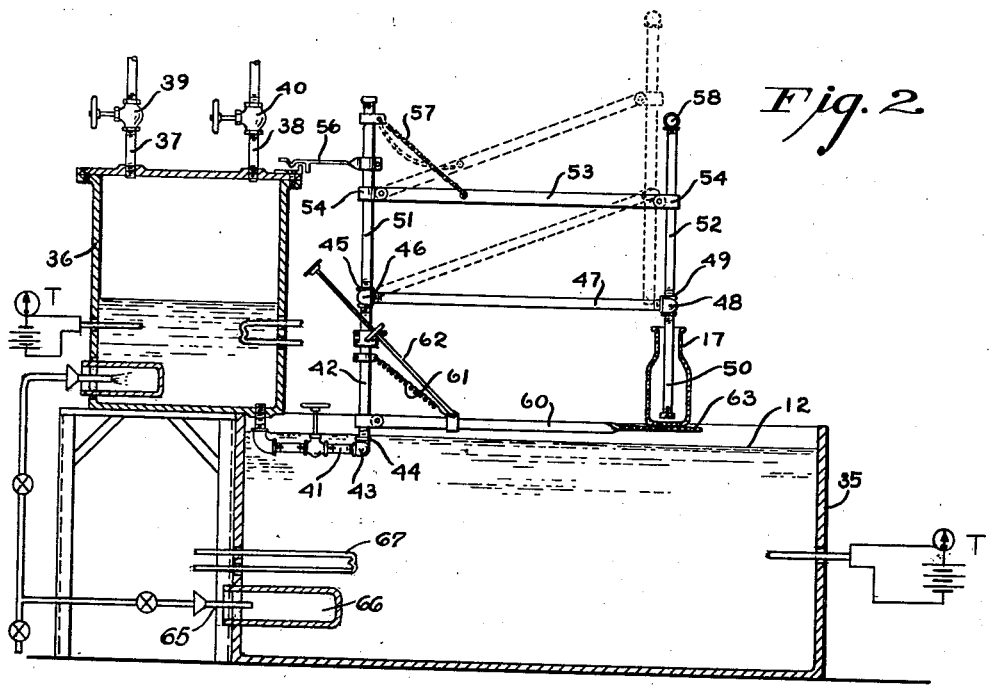
Fig. 2 is a vertical elevation partly in section through another form of apparatus suitable for tempering glass bottles in which the bottles are lowered into a chilling bath, mouth upwards.

The apparatus illustrated in Fig. 2 has been arranged to enable the latter method of tempering to be followed and comprises a tank 35 and a reservoir 36 similar to the corresponding parts in Fig. 1 and a bottle supporting assembly adapted for use in submerging a bottle into the fluid while the bottle is being filled with fluid supplied through a nozzle having apertures selectively arranged to direct the cooling medium towards those surface areas requiring the most vigorous chill, in the present example the junction of the wall and base of the bottle.

Figure 3:
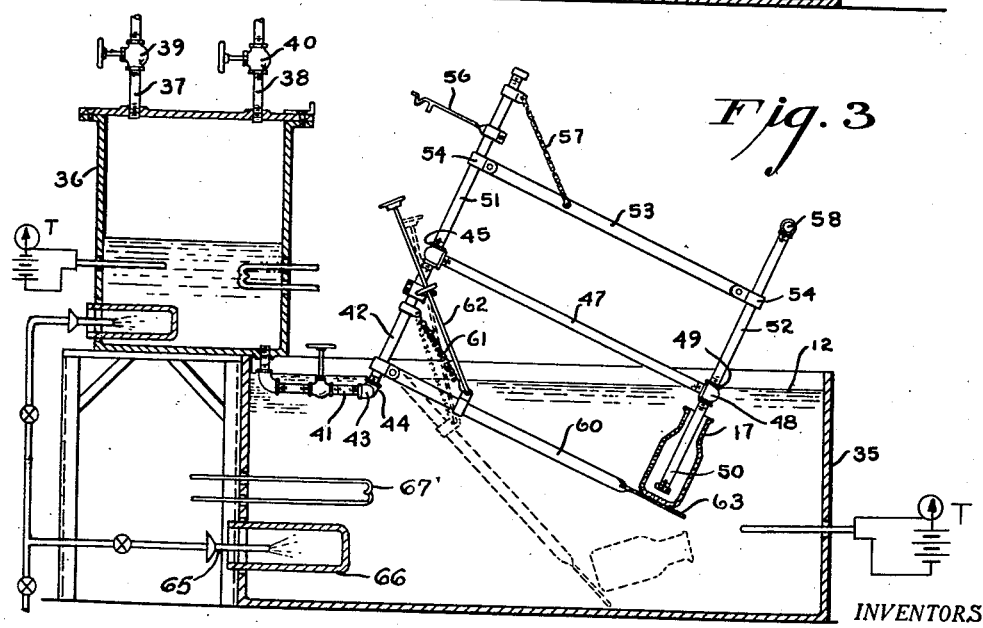
Fig. 3 is a vertical elevation partly in section through the apparatus of Fig. 2 showing the position of the apparatus after the bottle being acted on has been lowered into the chilling bath.

Referring to Figs. 2 and 3 in detail, vacuum and pressure lines 37 and 38, provided with valves 39 and 40 enter the reservoir 36 at the top. The bottom of the reservoir has an outlet passage from which a suitable fluid line 41 extends horizontally and to which a vertically disposed fluid pipe 42 is pivotally connected by a street elbow 43 threaded into an ordinary 90° elbow 44 in turn threaded onto the lower end of pipe 42. The upper end of pipe 42 carries a pipe T 45 into the side opening of which is threaded a street elbow 46. A horizontally disposed fluid conductor pipe 47 is threaded into elbow 46 and has its opposite ends threaded into a street elbow 48. The elbow 48 is in turn threaded into the side opening of a pipe T 49 into the downwardly disposed opening of which is threaded a suitable fluid spray nozzle 50. Serving as part of the fluid line supporting structure are suitably plugged pipes 51 and 52 threaded into the top openings of T's 45 and 49 respectively. These pipes are mechanically linked together by a horizontally disposed bar 53 pivoted to suitable collars 54 surrounding pipes 51 and 52. The down swinging movement of the assembly about the pivot provided by elbows 43 and 44 is normally prevented by a latch 56. The street elbows 46 and 48 as threaded into T's 45 and 49 also serve as pivot points enabling upward movement of the nozzle 50 and pipe 52 relative to pipes 42 and 51, while a chain 57 is provided to prevent downward movement of the nozzle relative to pipes 42 and 51. The top of pipe 52 is provided with a handle 58 for manually effecting the upward movement of the nozzle.

The bottle support comprises an arm 60 pivotally connected to pipe 42 and held in horizontal position by a spring 61 while a push rod 62 is arranged to enable downward movement of the arm 60 with respect to the nozzle to effect release of a bottle from the support when desired. The actual platform 63 at the free end of arm 60 is preferably of large mesh copper screen so that there occurs a minimum of interference with the transfer of heat from the bottom surfaces of the bottle to the fluid.

In employing the foregoing apparatus the nozzle is lifted into the position indicated by dash lines in Fig. 2, a suitably heated bottle 11 placed on the platform, and the nozzle 50 lowered into the bottle. The pressure valve 40 is then opened and the assembly moved to its alternative position, illustrated in Fig. 3, this preferably being done gradually so that the fluid rises about the inner and outer surfaces of the bottle substantially simultaneously. It may be preferable, however, in treating certain types of ware to chill one of the surfaces slightly in advance of the other and it should be understood that the present invention contemplates such practice. It will be observed that while the bottle is in the submerged position it is held at a substantial angle from vertical so that the chilling fluid is free to circulate by convection currents about the bottom surface of the bottle instead of being entrapped thereunder and becoming stagnant were the bottle held in a vertical position.

After the proper amount of fluid has been circulated through the bottle to obtain the chilling effect desired, the assembly may be lifted to the normal position and the bottle removed from the platform or, alternatively, push rod 62 may first be depressed and the bottle released into the tank from which it can later be removed. While the chilling fluid supplied from reservoir 36 may be of the same or different temperature than that in tank 35, satisfactory results have been obtained by using fluid of the same temperature as that in the tank. Any conventional form of apparatus may be employed in maintaining the chilling fluids in the respective tanks at the desired temperatures. In Figs. 2 and 3 of the present disclosure the fluid in tank 35 is heated by a flame from a burner 65 directed into a tube 66 surrounded by the chilling fluid 12, whereas a reduction in temperature of such fluid can be effected by the circulation of a suitable cooling medium through a coil 67 extended into the tank 35. An apparatus T is also associated with tank 35 to enable an attendant to readily observe the temperature of liquid 12 at all times. Similar heating, cooling, and indicating equipment is also associated with tank 36. A convenient way of filling reservoir 36 is to shut pressure line valve 40 and to open vacuum line valve 39 with the nozzle 50 immersed in the fluid. In this way the desired quantity of fluid may be quickly drawn into the reservoir from time to time as needed.

Figure 4:
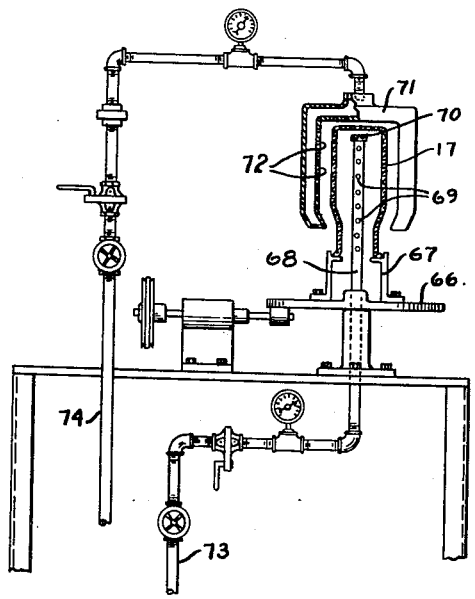
Fig. 4 is a vertical elevation partly in section through an alternative form of tempering apparatus employing air or other gas as the chilling medium.

As previously stated, the present invention also contemplates the tempering of glass articles by methods involving the use of streams of gaseous fluids such as steam or air directed toward the respective surfaces. Fig. 4 illustrates a form of apparatus adapted for tempering milk bottles by such methods. This apparatus includes a power driven turntable 66 having a suitable group of fingers 67 on which a bottle 11 to be tempered is placed in an inverted position. A fixed apertured tube 68 coincides with the axis of the table and extends to within a short distance from the inner bottom surfaces of the bottle, the apertures being distributed and their size calibrated in accordance with the intensity of the chill to be given to the respective surfaces of the bottle toward which they are directed. In the present illustration, a single row of apertures 69 serve to direct a chilling medium toward the inner side wall as the bottle is being rotated, while apertures 70 are radially disposed about the cap of the tube so as to direct a number of streams of chilling fluid toward the junction of the side wall and bottom of the bottle. A reservoir 71 has a row of apertures 72 in a wall thereof faced toward the bottle to direct jets of a cooling medium against its outer surfaces. The union in line 74 is provided to enable rotation of reservoir 71 away from tube 68, to enable a bottle 11 to be placed on or removed from supports 67 and 68.

It will be observed that the tube 68 and reservoir 72 receive their supply of cooling medium from two separately valved supply lines 73 and 74, thereby enabling (a) the use of two temperatures of chilling mediums, (b) chilling of the respective surfaces in different timed relation, and (c) effecting a more vigorous chill of either surface than of the other by maintenance of a suitable pressure differential of the fluids as they immerge from their respective apertures 69 and 72.

As hereinbefore clearly brought out, the proper tempering of certain surfaces such as the junction of the bottom and side wall of a bottle may be accomplished by directing streams of a chilling liquid against such surfaces. By use of the apertures illustrated in Fig. 4, these areas may be more highly chilled than are the other surfaces in any of several ways, (1) by initiating the chilling treatment in advance of that applied to the exterior surfaces, (2) by using a lower temperature chilling medium, (3) by appropriately increasing the pressure of the medium issuing from apertures 69 and 70, or (4) all of these courses of procedure may be employed jointly to obtain the desired result.

In employing the foregoing apparatus the reservoir 71 is temporarily swung clear of tube 68 to permit the placement of bottle 11 on the fingers 67, and after the return of the reservoir to the position shown, rotation of the table 66 is started. The valves in the chilling medium supply lines are then actuated to effect the chilling treatment in the manner desired.

We claim:

1. In a method of tempering a hollow glass article having side walls and a bottom which includes heating the article to a temperature near the softening temperature of the glass from which it is made and rapidly chilling the article to set a permanent condition of strain therein, the step of chilling the inner surfaces of the article forming the juncture of the side walls and bottom more severely than the remaining surfaces of the article.

2. In a method of tempering a hollow glass article having side walls and a bottom which includes heating the article to a temperature near the softening temperature of the glass from which it is made and rapidly chilling the article to set a permanent condition of strain therein, the step of chilling the interior of the article by fluid contact by introducing the chilling fluid through a nozzle positioned to direct said chilling fluid principally against the zone of juncture of the side walls and bottom of said article.

3. In a method of tempering a hollow glass article having side walls and a bottom which includes heating the article to a temperature near the softening temperature of the glass from which it is made and rapidly chilling the article to set a permanent condition of strain therein, the steps of chilling the exterior of the article by fluid contact and introducing the chilling fluid into the interior of the article before chilling fluid is applied to the exterior of the article.

4. In a method of tempering a hollow glass article having side walls and a bottom which includes heating the article to a temperature near the softening temperature of the glass from which it is made and rapidly chilling the article to set a permanent condition of strain therein, the steps of first directing chilling fluid against selected portions of the interior of the article and gradually immersing the article in a bath of chilling fluid as said interor becomes filled.

5. In a method of tempering a hollow glass article having side walls and a bottom which includes heating the article to a temperature near the softening temperature of the glass from which it is made and rapidly chilling the article to set a permanent condition of stress therein, the steps of first directing chilling fluid against selected portions of the interior of the article, and gradually immersing the article in a bath of chilling fluid as said interior becomes filled and continuing the introduction of the chilling fluid into the interior of the article for a predetermined period after the immersion of the article in the chilling bath is completed.

JESSE T. LITTLETON.
RALPH K. DAY.